May 14, 1963 R. A. BOZZOLA 3,089,304
TURBOCHARGER WASTE GATE SYSTEM
Filed March 1, 1962

INVENTOR.
RICCARDO A. BOZZOLA
BY
Lockwood, Woodard, Smith & Weikart
Attorneys

United States Patent Office 3,089,304
Patented May 14, 1963

3,089,304
TURBOCHARGER WASTE GATE SYSTEM
Riccardo A. Bozzola, Indianapolis, Ind., assignor to Schwitzer Corporation, Indianapolis, Ind., a corporation of Indiana
Filed Mar. 1, 1962, Ser. No. 176,628
6 Claims. (Cl. 60—13)

This invention relates generally to exhaust driven turbochargers for internal combustion engines and in particular to a system and apparatus for controlling the exhaust gas pressure delivered to the turbine side of a turbocharger and consequently the speed of the turbine rotor.

When a turbocharged internal combustion engine is started cold, there is an appreciable time interval between the start of the engine and the appearance of proper oil pressure at the locations (including particularly the turbocharger shaft bearings) requiring lubrication. Conventional bearing arrangements for turbochargers permit the turbocharger rotor to run safely in a condition of boundary lubrication for a reasonable length of time if the rotational speed of the rotor, and consequently of the turbocharger shaft, is kept low enough.

It is an object of the present invention to provide a system and apparatus which by-passes engine exhaust gases around the turbocharger turbine to hold its rotation at reduced speed until proper lubricating fluid pressure exists.

In internal combustion engines utilizing exhaust driven turbochargers it is highly desirable to provide a means for assuring that the maximum working pressure in the cylinders of the engine never reaches a dangerous level for the engine itself. If a means is provided for safeguarding against dangerous rise of the working presure in the cylinders, a turbocharger can be matched to an engine so as to maintain higher boost pressures (turbocharger compressor outlet pressure or engine intake manifold pressure) at low engine speeds without adding to the boost pressures at high engine speeds and thereby impairing the mechanical strength of the engine at high speed.

It is a further object of the present invention to provide a waste gate control system and apparatus which functions to limit the speed of the turbocharge rotor by means of a waste gate valve until proper lubricating pressure is attained and which, through the same waste gate valve, assures that the boost pressure does not exceed a predetermined value.

It is a further object of the present invention to provide a control system utilizing a single waste gate valve responsive to lubricating fluid pressure and to boost pressure for controlling the speed of a turbocharger, the waste gate valve being additionally responsive to abnormally high engine exhaust gas pressure to further limit the turbine speed and thereby protect the engine from malfunctioning of the boost pressure sensing means.

A further object of the present invention is to provide a turbocharger control system of the type referred to having means for maintaining relatively constant lubricating fluid pressure in the turbocharger under all engine operating conditions.

These and other objects will become apparent as the description proceeds with reference to the accompanying drawings in which.

Figure 1:
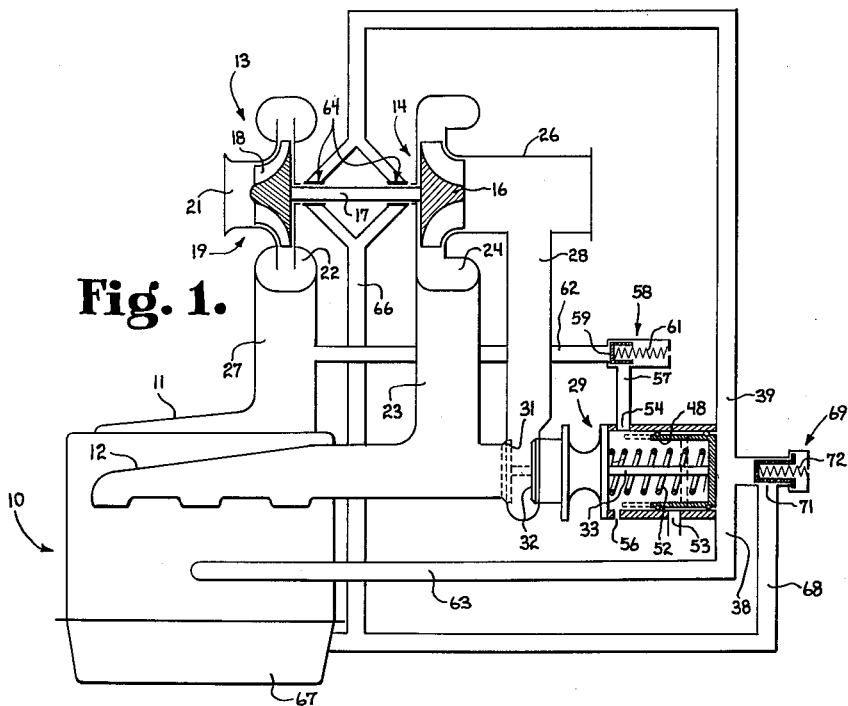
FIG. 1 is a schematic view showing the system and apparatus of the present invention incorporated with a turbocharged internal combustion engine.

Referring initially to FIG. 1 there is shown schematically at 10 an internal combustion engine having an intake manifold 11 and an exhaust manifold 12. The engine is charged by an exhaust driven turbocharger indicated generally at 13.

The turbocharger 13 itself is of conventional type and includes a turbine 14 having a rotor 16. A common turbocharger shaft 17 connects the rotor 16 with a compressor wheel 18 forming a component of a compressor indicated generally at 19.

The compressor 19 is provided with an inlet passage 21 and the air entering the inlet passage is compressed and discharged by the compressor wheel 18 into the compressor outlet passage or collector chamber 22. The driving force for the compressor is provided by the expansion of engine exhaust gases through the turbine 14. An exhaust passage 23 provides communication between the engine exhaust manifold 12 and the turbine inlet passage or collector chamber 24. The spent gases leaving the turbine rotor 16 are discharged to atmosphere through the discharge duct 26. As previously mentioned the turbine rotor drives the compressor wheel 18 and the compressed air produced at the compressor outlet chamber 22 is introduced into the engine intake manifold 11 by means of the inlet passage 27. A waste gate passage 28 communicates with the exhaust passage 23 and atmosphere through the discharge duct 26.

Figure 3:
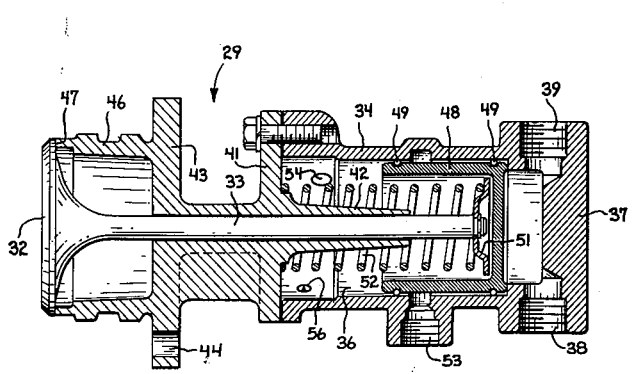
FIG. 3 is a side sectional view taken generally along the line 3—3 of FIG. 2.

A waste gate valve, indicated generally at 29 controls communication between said exhaust passage 23 and the waste gate passage 28. The valve includes a seat 31 formed at the junction of the waste gate passage and the exhaust passage and a valve member in the form of a poppet valve disc 32 cooperating with the valve seat. The valve member 32 is carried on the end of a valve stem 33 and specific reference is now made to FIGS. 2 and 3 where the structure of the waste gate valve 29 is shown in detail.

The waste gate control valve 29 includes a tubular housing 34 having a central bore therein 36. One end of the housing is closed by an integral end member 37, the end member having formed therein the lubricating fluid inlet passage 38 and a lubricating fluid outlet passage 39. The passages 38 and 39 communicate with the cavity or bore within the housing. The opposite end of the housing is closed by the end member 41 which is bolted to the housing body. The end member 41 is formed with an extending neck portion 42 which protrudes a substantial distance within the housing bore and serves as a guide for the stem 33. The end member 41 is further integrally formed with a flanged section 43 having spaced apertures 44 therein for mounting of the control valve. The portion 43 of the end member 41 has a cup-shaped terminal portion 46 whose margin 47 provides an annular stop for the valve member 32 limiting the rightward motion (as viewed in FIG. 3) of the valve 32 and the stem 33. The end member 41 and its associated portions 43 and 46 are configurated so as to minimize heat transfer from the portion 46 to the control valve housing. The central bore 36 of the housing is provided with a movable wall in the form of a piston 48 which is reciprocable within the bore, the sealing rings 49 serving to provide a seal between the faces of the movable wall.

The inner end of the stem 33 carries a spring retainer 51 which seats a compression spring 52, the opposite end of the spring seating against the inner face of the end member 41. The housing 34 is provided with a drain passage 53 which may open to atmosphere and functions to vent the structure and to discharge any pressure between the sealing rings 49 on the piston and to discharge any oil leaks into the area between the sealing rings. It will be noted that when the valve 32 is closed against its seat 31 (FIG. 1), the piston is not moved leftwardly sufficient to uncover the passage 53 and the passage 53 is never in communication with the lubricating fluid inlet and outlet passages 38 and 39. The housing is further provided with an inlet passage 54 leftwardly of the piston 48 as viewed in FIG. 3 and is also provided with a metering orifice 56 communicating with atmosphere or to an area of low pressure as will be evident from FIG. 1.

Figure 2:
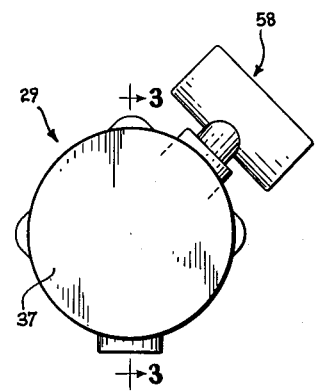
FIG. 2 is an end view of one of the components shown in FIG. 1.

The inlet passage 54 in the housing 34 communicates with an air passage or line 57 as indicated schematically in FIG. 1. The passage 57 communicates with the interior of an air pressure sensing valve or control valve indicated generally at 58. It will be understood that while in FIG. 1 the control valve 58 is shown mounted remotely from the waste gate valve 29, it may be mounted on the waste gate valve as indicated in FIG. 2 and when so arranged the passage 57 is relatively short. The interior of the valve 58 is shown schematically in FIG. 1 and includes a housing within which a valve member 59 is movable. A compression spring 61 urges the valve member 59 into an extreme position in which the passage 57 is closed. The outer face of the valve member 59 is exposed to air pressure within an air inlet passage 62 which communicates with the air inlet passage 27.

A lubricating fluid or oil line 63 is supplied with lubricating oil for the turbocharger shaft bearings at a predetermined pressure provided by an oil pump (not shown) driven by the internal combustion engine 10, or by an independent source of oil under pressure. The lubricating oil supply line 63 communicates with the interior of the waste gate valve housing 34 by means of the inlet and outlet passages 38 and 39 and carries lubricating oil to the turbocharger shaft bearings indicated schematically at 64 in FIG. 1. An oil return line 66 discharges the oil into the engine oil sump 67. A further oil return line 68 communicates with the pressurized oil supply line 63 and the passage of oil through the line 68 is controlled by a relief valve indicated generally at 69. The interior of the relief valve 69 is shown schematically in FIG. 1 and may include a valve member 71 which is biased into a position closing the passage 68 by means of a compression spring 72. The outer face of the valve member 71 is exposed to the pressurized lubricating fluid within the line 63. It will be understood that the valves 69 and 58 provide a spring biased closure of their respective controlled lines and that specific valve arrangement other than those schematically shown in FIG. 1 might be utilized to perform this function.

In operation, before the engine 10 is started the waste gate valve member 32 will be in its solid line position of FIG. 1 away from its seat 31. As the engine is started, exhaust gas under pressure will be delivered to the exhaust manifold 12. This gas will expand into lower pressure areas, a portion of it going through the open waste gate valve seat 31, through the passage 28 and 26 to atmosphere. The balance of the gas will move through the passage 23 and expand through the turbine inlet passage 24 and the turbine rotor 16, discharging to atmosphere through the passage 26. The expansion through the turbine rotor of only a portion of the total exhaust gas flow will cause the rotor, rotor shaft 17 and compressor wheel 18 to rotate at some speed below the normal operating speed, that is, the speed at which the rotor is driven when the waste gate valve member 32 is closed against its seat 31.

As the engine continues to run, the engine oil pump delivers oil through the line 63 to the turbocharger shaft bearing 64, this delivery of oil exposing the righthand face (as viewed in FIG. 1) of the piston 48 to the oil pressure. When the oil pressure in the line 63 has reached a predetermined value, the pressure exerted on the outer face of the piston 48 is sufficient to overcome the force exerted by the compression spring 52 and thereby moves the valve member 32 against its seat 31. In this position of the valve member 32 the junction between the passage 23 and 38 is closed forcing all of the exhaust gas to expand through the turbine rotor causing the turbocharger to accelerate and reach normal operating speed.

The normal operating oil pressure has been reached in the shaft bearing by the time the valve closes to permit the turbocharger to accelerate and reach normal operating speed.

With the engine 10 running, should the boost pressure in the passage 27 reach an undesirably high value, the valve member 59 in the control valve 58 will be moved rightwardly (as viewed in FIG. 1) to open the passage 57 allowing compressed air to fill the housing bore 36 leftwardly (as viewed in FIG. 1) of the piston 48. This pressure on the piston together with the force exerted by spring 52 causes the piston to move against the oil pressure thereby displacing the valve member 32 away from its seat 31. The compressed air entering the waste gate valve housing 34 is dumped to the atmosphere through the metering orifice 56 thereby allowing a constant pressure level to be reached inside the waste gate valve housing and hence establishing an equilibrium position of the waste gate valve member 32. When the valve member 32 thus leaves its seat 31 a portion of the exhaust gas flows through the waste gate valve into the passage 28 and thence to atmosphere. The proportioning between the amount of exhaust gas dumped through the waste gate valve and the amount expanded through the turbine rotor is such that the power developed by the turbine and delivered to the compressor is only that required to maintain the compressor outlet pressure at the desired level. This action assures that the boost pressure in the engine inlet manifold 11 does not exceed a predetermined value, this value being such that the maximum working pressure in the cylinders of the engine never reaches a dangerous level. Thus a turbocharger with a waste gate control system described can be matched to an engine in such a way that higher boost pressures are maintained at low engine speeds without impairing the mechanical strength of the engine at high engine speeds. An improved torque characteristic for the engine may thus be obtained over the normal engine speed range.

The exposure of the face of the valve member 32 to engine exhaust manifold pressure provides a safety feature protecting against any failure of the control valve 58 to open at the predetermined, limiting boost pressure. In the event that the control valve 58 fails to open, the boost pressure in the passage 27 will increase above its limiting value established by the control valve 58. Consequently, the exhaust gas pressure in the engine exhaust manifold 12 also increases. When this increase in exhaust manifold pressure reaches a sufficiently high value, it will act on the outer face of the valve member 32 to move the valve member 32 away from its seat 31, this action being aided by the force exerted by the compression spring 52. The opening of the waste gate valve reduces the volume of gas moving through the turbine, reduces the turbocharger speed and consequently reduces or limts the boost pressure within the passage 27.

While this opening of the waste gate valve under abnormally high exhaust manifold pressure occurs at a fairly constant value of the exhaust gas pressure if the oil pressure on the piston 48 is kept constant, under abnormal conditions a considerable increase in oil pressure can occur. During normal engine operation the oil pressure is relatively constant, however, when the engine is cold substantially increased oil pressure can exist. The oil pressure relief valve 69 serves to keep the oil pressure relatively constant under any conditions of operation of the engine. Should the oil pressure rise to an abnormally high value the valve member 71 in the valve 69 will be moved to open the passage 68 discharging oil through the line 68 to the engine oil sump 67 and thereby lowering the pressure in the line 63.

In addition to the features of the system referred to above, it should be noted that the system reacts in an advantageous way to an increase in the altitude at which the engine 10 is operating. Since the control valve member 59 in the control valve 58 opens against the constant load supplied by the spring 61, the maximum allowed increment of boost pressure above the atmospheric pressure is held constant regardless of the altitude at which the engine 10 is operating. The turbocharger may thus increase its rotational speed as the altitude at which the engine operates increases approximately at the same rate as such altitude compensating increase occurs in an uncontrolled or free running turbocharger. When controlled by the system of the present invention the turbocharger thus delivers a higher compressor pressure ratio (the ratio of compressor inlet pressure to compressor outlet pressure) as altitude increases and thereby at least partially compensates for the decrease of ambient pressure as altitude increases and prevents a substantial loss of power in the engine. The system provides an increasing compressor pressure ratio as altitude increases and does not attempt to hold a constant compressor pressure ratio with altitude increases.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed:

1. A control system for a turbocharged internal combustion engine having intake and exhaust manifolds, said system including a turbocharger having a compressor and a turbine for driving said compressor, means providing lubricating fluid under pressure for the compressor and turbine bearings, said compressor and turbine each having inlet and outlet passages, an exhaust passage providing communication between said engine exhaust manifold and said turbine inlet passage whereby said turbine is driven by the exhaust gases, an inlet passage providing communication between said compressor outlet passage and said engine intake manifold to supply a boost pressure thereto, a waste gate passage communicating with said exhaust passage and atmosphere, a valve for controlling said waste gate passage including a seat disposed at the junction of said waste gate passage and said exhaust passage, a valve member rectilinearly movable toward and away from said valve seat thereby closing and opening said valve, the upstream face of said valve member being exposed to the pressure in said exhaust manifold passage when said valve is closed, resilient means biasing said valve member away from said valve seat, a control housing having a movable wall therein dividing said housing into two chambers, means interconnecting said movable wall and said valve member whereby pressure within said housing on one side of said movable wall aids the force exerted by said resilient means tending to move said valve member away from said seat and pressure within said housing on the other side of said movable wall opposes said resilient means to urge said valve member toward said seat, a lubricating fluid line for introducing lubricating fluid under a predetermined pressure into said housing on said other side of said movable wall, whereby said predetermined pressure on said other side of said movable wall overcomes said resilient means causing said waste gate valve member to move to said valve seat closing said waste gate valve, a passage providing communication between said inlet passage and the interior of said housing at said one side of said movable wall for introducing thereto a pressure which is a direct function of the compressor outlet pressure, a control valve normally closing said last mentioned passage and opening said passage only upon the existence of a predetermined limiting compressor outlet pressure, whereby said waste gate valve member is held off said seat at a position in which the exhaust gas pressure in the turbine inlet passage produces a compressor speed which maintains a predetermined pressure in the compressor outlet passage, and upon failure of said control valve to open at said predetermined compressor outlet pressure said waste gate valve member will be moved away from said seat by the pressure in said exhaust passage.

2. A control system as claimed in claim 1 having a normally closed relief valve for opening said lubricating fluid line to an area of relatively low pressure, said relief valve opening in response to abnormally high pressure in said lubricating fluid line to maintain a relatively constant oil pressure.

3. A control system for a turbocharged internal combustion engine having intake and exhaust manifolds, said system including a turbocharger having a compressor and a turbine for driving said compressor, means providing lubricating fluid under pressure for the compressor and turbine bearings, said compressor and turbine each having inlet and outlet passages, an exhaust passage providing communication between said engine exhaust manifold and said turbine inlet passage whereby said turbine is driven by the exhaust gases, an inlet passage providing communication between said compressor outlet passage and said engine intake manifold to supply a boost pressure thereto, a waste gate passage communicating with said exhaust passage and atmosphere, a valve for controlling said waste gate passage including a valve seat, a valve member movable toward and away from said valve seat to close and open said valve, the upstream face of said valve member being exposed to the pressure in said exhaust manifold passage when said valve is closed, resilient means biasing said valve member away from said valve seat, a control housing having a movable wall therein dividing said housing into two chambers, means interconnecting said movable wall and said valve member whereby pressure within said housing on one side of said movable wall aids the force exerted by said resilient means tending to move said valve member away from said seat and pressure within said housing on the other side of said movable wall opposes said resilient means to urge said valve member toward said seat, a lubricating fluid line for introducing lubricating fluid under said predetermined pressure into said housing at said other side of said movable wall, a passage providing communication between said inlet passage and the interior of said housing at said one side of said movable wall for introducing thereto a pressure which is a direct function of the compressor outlet pressure a control valve normally closing said last mentioned passage and opening said passage only upon the existence of a predetermined limiting compressor outlet pressure, whereby said waste gate valve member is held off said seat at a position in which the exhaust gas pressure in the turbine inlet passage produces a compressor speed which maintains a predetermined pressure in the compressor outlet passage, and upon failure of said control valve to open at said predetermined compressor outlet pressure said waste gate valve member will be moved away from said seat by the pressure in said exhaust passage.

4. A control system for a turbocharged internal combustion engine having intake and exhaust manifolds, said system including a turbocharger having a compressor and a turbine for driving said compressor, means providing lubricating fluid under pressure for the compressor and turbine bearings, said compressor and turbine each having inlet and outlet passage, an exhaust passage providing communication between said engine exhaust manifold and said turbine inlet passage whereby said turbine is driven by the exhaust gases, an inlet passage providing communication between said compressor outlet passage and said engine intake manifold to supply a boost pressure thereto, a waste gate passage communicating with said exhaust passage and atmosphere, a valve for controlling said waste gate passage including a seat formed at the junction of said waste gate passage and said exhaust passage, a valve member rectilinearly movable toward and away from said valve seat thereby closing and opening said valve, the upstream face of said valve member being exposed to the pressure in said exhaust manifold passage when said valve is closed, resilient means biasing said valve member away from said valve seat, a control housing having a movable wall therein dividing said housing into two chambers, means interconnecting said movable wall and said valve member whereby pressure within said housing on one side of said movable wall opposes said resilient means to urge said valve member toward said seat, a lubricating fluid line for introducing lubricating fluid under said predetermined pressure into said housing at said one side of said movable wall, whereby said waste gate valve member remains off said seat until the lubricating fluid attains a pressure sufficient to overcome said resilient means, said lubricating fluid line being appreciably shorter from said control housing to said turbocharger bearings than from said control housing to said lubricating fluid pressure supplying means.

5. A control system for a turbocharged internal combustion engine having intake and exhaust manifolds, said system including a turbocharger having a compressor and a turbine for driving said compressor, means providing lubricating fluid under pressure for the compressor and turbine bearings, said compressor and turbine each having inlet and outlet passages, an exhaust passage providing communication between said engine exhaust manifold and said turbine inlet passage whereby said turbine is driven by the exhaust gases, an inlet passage providing communication between said compressor outlet passage and said engine intake manifold to supply a boost pressure thereto, a waste gate passage communicating with said exhaust passage and atmosphere, a valve for controlling said waste gate passage including a valve seat, a valve member movable toward and away from said valve seat to close and open said valve, the upstream face of said valve member being exposed to the pressure in said exhaust manifold passage when said valve is closed, resilient means biasing said valve member away from said valve seat, a control housing having a movable wall therein dividing said housing into two chambers, means interconnecting said movable wall and said valve member whereby pressure within said housing on one side of said movable wall opposes said resilient means to urge said valve member toward said seat, a lubricating fluid line for introducing lubricating fluid under said predetermined pressure into said housing at said one side of said movable wall, thereby said waste gate valve member remains off said seat until the lubricating fluid attains a pressure sufficient to overcome said resilient biasing means.

6. A control system as claimed in claim 5 having a normally closed relief valve for opening said lubricating fluid line to an area of relatively low pressure, said relief valve opening in response to abnormally high pressure in said lubricating fluid line to limit the pressure therein.

References Cited in the file of this patent
UNITED STATES PATENTS

| | | |
|---|---|---|
| 1,310,683 | Sherbondy | July 22, 1919 |
| 2,440,883 | Wiegman | May 4, 1948 |
| 3,035,408 | Silver | May 22, 1962 |
| 3,043,092 | Addie et al. | July 10, 1962 |